United States Patent
Oliver et al.

[15] 3,656,957

[45] Apr. 18, 1972

[54] PHOTOGRAPHIC SILVER HALIDE EMULSIONS CONTAINING K-SUBSTITUTED CARBOCYANINE DYES

[72] Inventors: Gene L. Oliver; Leslie G. S. Brooker, both of Rochester, N.Y.

[73] Assignee: Eastman Kodak Company, Rochester, N.Y.

[22] Filed: Apr. 3, 1970

[21] Appl. No.: 25,549

[52] U.S. Cl. ................................96/127, 96/134, 96/137, 260/240.1
[51] Int. Cl. ..........................................G03c 1/10
[58] Field of Search ..................................96/127, 134, 137

[56] References Cited

UNITED STATES PATENTS

| | | |
|---|---|---|
| 2,471,488 | 5/1949 | Kendall et al. ..........................96/127 |
| 2,719,151 | 9/1955 | Haseltine et al. ........................96/127 |
| 3,164,586 | 1/1965 | Ficken ....................................96/127 |
| 3,164,587 | 1/1965 | Ficken ....................................96/127 |

FOREIGN PATENTS OR APPLICATIONS 725,825  10/1942  Germany ...............................96/137

Primary Examiner—J. Travis Brown
Attorney—W. H. J. Kline, J. R. Frederick and D. M. DeLeo

[57] ABSTRACT

An extensive range of $\mu$-substituted carbocyanine dyes are prepared by reacting a $\mu$-chloro-carbocyanine dye with a reagent having a reactive nucleophilic residue which replaces the $\mu$-chloro substituent. The dyes which can be so prepared include novel dyes wherein the reactive nucleophilic residue is less nucleophilic than those presently employed. The resultant novel dyes are useful as coloring materials and as spectral sensitizers for photographic silver halide.

6 Claims, No Drawings

PHOTOGRAPHIC SILVER HALIDE EMULSIONS CONTAINING K-SUBSTITUTED CARBOCYANINE DYES

This invention relates to carbocyanine dyes and their preparation, and particularly to carbocyanine dyes having a substituent attached to the meso-position ($\mu$-) and useful as colorant materials and as spectral sensitizers in photographic silver halide emulsions.

A wide variety of $\mu$-substituted carbocyanine dyes are known, many of which are spectral sensitizers for photographic silver halide. The meso-position, represented by the symbol $\mu$-, refers to the central atom of the trimethine chain which intervenes the two heterocyclic nuclei present in carbocyanine dyes. Conventionally, these $\mu$-substituted carbocyanine dyes are prepared from $\mu$-alkylthio- or $\mu$-arylthio-substituted carbocyanine dyes by reaction with an organic species which is sufficiently nucleophilic to replace the alkylthio or arylthio substituent. Heretofore, however, it has not been possible to prepare $\mu$-substituted carbocyanine dyes whose $\mu$-substituent is derived from a reagent so low in nucleophilicity that it cannot displace phenylmercaptide or other arylmercaptide or alkylmercaptide ion. Additionally, the preparation of known $\mu$-substituted carbocyanine dyes often requires the use of strong reaction conditions and results in low reaction product yield.

Accordingly, it is an object of this invention to provide new $\mu$-substituted carbocyanine dyes.

Another object of this invention is to provide a novel process for preparing $\mu$-substituted carbocyanine dyes.

Still another object of this invention is to provide a new process for preparing $\mu$-substituted carbocyanine dyes from reagents of low nucleophilicity.

Yet an additional object of the present invention is to provide novel photographic silver halide emulsions sensitized with $\mu$-substituted carbocyanine dyes.

These and other objects of the instant invention will become increasingly apparent from a consideration of the following specification and appended claims.

The objects of this invention are accomplished in a first aspect with a process for preparing $\mu$-substituted carbocyanine dyes by reacting a $\mu$-chlorocarbocyanine dye with a reagent having a nucleophilic residue which replaces the $\mu$-chloro-substituent. Additionally, the objects of the present invention are further accomplished with new $\mu$-substituted carbocyanine dyes derived from $\mu$-chloro-substituted carbocyanine dyes and having as the $\mu$-substituent an organic residue of low nucleophilicity, i.e., incapable of displacing alkylmercaptide ions or arylmercaptide ions. In yet another aspect, the objects of this invention are accomplished with light-sensitive photographic silver halide emulsions including a hydrophilic colloid, silver halide grains and a sensitizing amount of a $\mu$-substituted carbocyanine dye derived from a $\mu$-chloro-substituted carbocyanine dye and having as the $\mu$-substitent a monovalent organic residue of low nucleophilicity, i.e., incapable of displacing alkyl-mercaptide ions or arylmercaptide ions.

The process described herein advantageously utilizes $\mu$-chloro-substituted carbocyanine dyes as a pre-formed dye precursor to a wide range of derivative $\mu$-substituted carbocyanine dyes that are prepared according to the process of this invention. A detailed description of the useful $\mu$-chloro-substituted carbocyanine dye precursors and their preparation is presented in a U.S. Pat. application Ser. No. 25,550 entitled PHOTOGRAPHIC EMULSIONS AND $\mu$-CHLOROCARBOCYANINE DYES, filed Apr. 3, 1970 in the name of Gene L. Oliver and presently copending herewith. Advantageous precursor $\mu$-chlorocarbocyanine dyes include those having the formula:

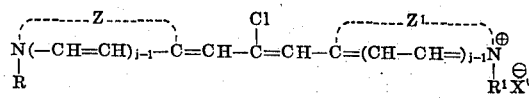

wherein:

a. each of Z and Z' represents the non-metallic atoms necessary to complete a heterocyclic nucleus of the type used in cyanine dyes, b. j represents a positive integer having a value of from 1 to 2, c. each of R and $R^1$ represents an alkyl radical having from one to four carbon atoms, and d. $X^-$ represents a non-nucleophilic anion.

Desirable nuclei of the types used in cyanine dyes include those wherein the non-metallic atoms represented by Z and $Z^1$ are those necessary to complete (in conjunction with the specific nuclear atoms described in the above formula I) heterocyclic nuclei having in the nuclei at least one atom selected from the group consisting of nitrogen, oxygen, sulfur and selenium. Advantageous heterocyclic nuclei completed by Z and $Z^1$ atoms also include those containing a heterocyclic ring, which can be fused to additional ring systems, having a chromophoric nitrogen atom and from four to five additional atoms of which from three to four atoms are carbon atoms and wherein the remaining additional atom is selected from either carbon, nitrogen, oxygen, sulfur or selenium atoms.

Exemplary heterocyclic nuclei completed by non-metallic Z and $Z^1$ atoms include those nuclei of the indolenine series such as indolenine (3H-indole); those of the benzindolenine series like 1H-benz(e)indole and those of the naphthindolenine series such as 3-H-naphth[2,1-e]indole; those of the imidazole series such as benzimidazole compounds like 5-chlorobenzimidazole and also including compounds of the naphthimidazole series; those of the thiazole series like thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.; those of the benzothiazole series such as benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylonobenzothiazole, 5-hydroxybenzothiazole, 6-hydroxybenzothiazole, etc.; those of the naphthothiazole series like naphtho[2,1-d]thiazole, 8-methoxynaphtho[2,1-d]thiazole, 7-methoxynaphtho[2,1-d]thiazole, naphtho-[1,2-d]thiazole, 8-methoxynaphtho[1,2-d]thiazole, etc.; those of the thionaphtheno-7',6',4,5-thiazole series such as 4-methoxythionaphtheno-7',6',4,5-thiazole, etc.; those of the oxazole series for example, 4-methyloxazole, 5-methyloxazole, 4-phenyloxazole, 4,5-diphenyloxazole, 4-ethyloxazole, 4,5-dimethyloxazole, 5-phenyloxazole, etc.; those of the benzoxazole series like benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.; those of the naphthoxazole series such as alpha-naphtho[2,1-d]oxazole, etc.; those of the selenazole series, for example, 4-methylselenazole, 4-phenylselenazole, etc., those of the benzoselenazole series like benzoselenazole, 5-chlorobenzoselenazole, 5-methoxybenzoselenazole, 5-hydroxybenzoselenazole, tetrahydrobenzoselenazole, etc.; those of the naphthoselenazole series such as naphtho[2,1-d]selenazole; and those of the quinoline series such as quinoline, 4-methylquinoline, 5-ethylquinoline, 6-chloroquinoline, 8-chloroquinoline, 6-methoxyquinoline, 8-hydroxyquinoline, 7-methyl-4-quinoline, isoquinoline, etc.

Particularly advantageous $\mu$-chlorocarbocyanine dyes include such dyes as, for example:

a $\mu$-chloro-3,3'-diethylthiacarbocyanine dye, a $\mu$-chloro-3,3'-dimethyloxathiacarbocyanine dye, a $\mu$-chloro-3,3'-diethylselenacarbocyanine dye, a μ-chloro-3,3'-methoxyethylthiacarbocyanine dye,
a 6,6' μ-trichloro-1,1'-diethyl-2,4'-carbocyanine dye,
a μ-chloro-3,3'-diethyl-5,5'-phenylbenzothiacarbocyanine dye,
a μ-chloro-5-methyl-5'-ethyloxathiacarbocyanine dye,
a μ-chloro-5,5'-dihydroxyselenacarbocyanine dye,
a μ-chloro-5-phenyl-5,6'-dimethoxythiacarbocyanine dye,
a μ-chloro-1,1'-diethyl-2,2'-carbocyanine dye, and
a μ-chloro-1,1'-diethyl-4,5;4',5'-dibenzothiacarbo-cyanine dye.

The μ-chlorocarbocyanine dyes useful herein are conveniently prepared by reacting two heterocyclic quaternary salts having substantially non-nucleophilic anions. Their preparation is advantageously carried out in organic solvents, such as dimethylformamide, dimethylacetamide, acetonitrile, acetone, chloroform, etc.; which are solvents for each reagent but not for the resultant μ-chlorocarbocyanine dye. Reaction temperature can be extensively varied, with temperatures ranging from about 0° C. to either the boiling point of the solvent medium or the decomposition temperature of the dye, whichever is lower. Reflux conditions are often desirable. The reaction is also preferably carried out in the presence of a basic condensing agent such as, for example, an amine base such as an alkylamine like triethylamine or additional known basic condensing agents including N-methylpiperidine, N-ethylpiperidine, N,N-diethylaniline, triethylenediamine, etc. The reaction is easily followed by noting the color change as the absorption maxima of the medium shifts upon formation of the μ-chlorocarbocyanine dye, which spontaneously precipitates from solution.

As previously noted, the μ-chlorocarbocyanine dyes described herein are useful as intermediates or precursors in the preparation of additional μ-substituted carbocyanine dyes. The μ-chloro substituted carbocyanine dyes exhibit an increased solubility in common reaction media, such as when compared to the μ-arylthiocarbocyanine dyes or μ-alkylthiocarbocyanine which are conventionally used to prepare other μ-substituted dyes. Additionally, unlike the μ-arylthio, e.g., μ-phenylthio, substituted carbocyanine dyes, the μ-chloro substituent is readily displaceable by nucleophiles less nucleophilic than those capable of displacing the mercaptide ions produced in solution by alkyl-or arylthio substituents. This capability effectively increases the range of potential alternative substituents which can be attached at that position. Utilizing μ-chloro substituted carbocyanine dyes as precursors also permits the preparation of other μ-substituted carbocyanine dyes at increased reaction rates and under milder reaction conditions than those conventionally employed heretofore.

Preparing μ-substituted carbocyanine dyes according to the subject process is conveniently accomplished by reacting a μ-chlorocarbocyanine dye (such as those described herein) and a reagent having a nucleophilic residue which replaces the μ-chloro substituent.

The reactions are generally accomplished in solution and in the presence of a basic condensing agent. Additionally, they can be promoted by the application of heat. Temperatures above about 30° C. and ranging up to either reflux temperature for the particular solvent medium or the decomposition temperature of the reagents or reaction product are useful. Conventionally, temperatures between about 50° C. and 150° C. are employed, with reflux conditions being desirable in many instances to provide an accelerated reaction rate. Useful organic solvent media include amidic solvents such as dimethylformamide, dimethylacetamide and the like, as well as other polar aprotic solvents such as dimethylsulfoxide, sulfolane, acetonitrile and the like. Additionally, any of the known basic condensing agents can be included in the reaction mixture. Typical condensing agents, e.g., triethylamine, are described elsewhere herein.

The reagents which can be reacted with a μ-chlorocarbocyanine dye to prepare additional μ-substituted carbocyanine dyes include reagents having a nucleophilic residue which replaces the μ-chloro substituent in organic media. Exemplary of such reagents include those which dissociate in a reaction mixture to permit the formation of a nucleophilic residue, i.e., an entering group that displaces the chloro substituent at the μ-position, forming a new carbocyanine dye wherein the prior μ-chloro substituent is replaced by the nucleophilic residue. Accordingly, known reagents for preparing μ-substituted carbocyanine dyes which are sufficiently nucleophilic to replace an alkylthio or an arylthio substituent at the μ-position are likewise useful in preparing such dyes according to the present process which utilizes a μ-chlorocarbocyanine dye as the dye precursor. Since the chloro substituent is a more readily displaced leaving group, preparations using reagents which will displace the noted thio radicals can be accomplished under milder reaction conditions and at faster rates. Specifically, the μ-chlorocarbocyanine dye precursor exhibits increased solubility in mild solvent media like those mentioned herein than do the known dye precursor and will support comparable reactions at lower temperatures, providing an especially advantageous synthetic pathway where difficulties in reagent or product stability can occur.

Also useful herein are reagents which provide a residue having such low nucleophilicity that they will not displace an alkylthio or arylthio group to give an alkylmercaptide ion or an arylmercaptide ion, e.g., ethylmercaptide, isopropylmercaptide, phenylmercaptide, etc. As mentioned herein, various mercaptide ions are the species produced in solution by known μ-alkylthio or μ-arylthio substituted carbocyanine dyes, and they are the particular species which must be displaced from those dye precursor to prepare another μ-substituted derivative dye by nucleophilic substitution. Using reagents which provide residues having a very low nucleophilicity and according to the described process, novel dyes such as those having the formulas:

II 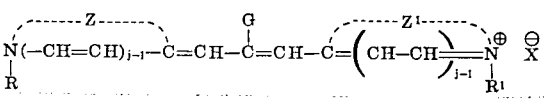

and

III 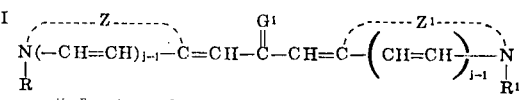

wherein each of G and $G^1$ represents an organic residue which is low in nucleophilicity, i.e., incapable of displacing either alkylmercaptide ions or arylmercaptide ions, and wherein Z, $Z^1$, j, R, $R^1$ and X are as previously described, can be prepared by reacting a μ-chloro substituted carbocyanine dye like one having a formula as represented hereinabove by formula I with a reagent which yields an organic residue which is incapable of displacing either alkylmercaptide ion or arylmercaptide ion but which can replace a μ-chloro substituent. Especially advantageous reagents of this type include compounds such as 5-mercapto-1-phenyltetrazole, sodium cyanide, imidazole, benzimidazole, benzotriazole, carbazole, 3,5-dimethylpyrazole, diphenylmethanedisulfonate, bis(ethylsulfonyl)methane sodium salt, etc.

Particularly useful μ-substituted carbocyanine dyes include such dyes as those represented above by formulas II and III wherein each of Z and $Z^1$ represent such specific atoms and nuclei and $\overset{\ominus}{X}$ represents such anions as are specified herein with reference to the μ-chlorocarbocyanine dyes.

Particular μ-substituted carbocyanine dyes of this invention include:

3,3'-Diethyl-μ-(1-imidazolyl)thiacarbocyanine chloride
μ-(1-Benzimidazolyl)-3,3'-diethylthiacarbocyanine chloride
μ-(1-Benzotriazolyl)-3,3'-diethylthiacarbocyanine chloride
3,3'-Diethyl-μ-(3,5-dimethyl-1-pyrazolyl)thiacarbocyanine chloride
μ-Cyano-3,3'-diethylthiacarboycanine chloride
μ-(9-Carbazolyl)-3,3'-diethylthiacarbocyanine chloride
2-Bis(phenoxysulfonyl)methylene-1,3-bis(3-ethyl-2-benzothiazolinylidene)propane 2-Bis (ethylsulfonyl) methylene-1,3-bis (3-ethyl-2-benzothiazolinylidene)propane New μ-substituted carbocyanine dyes described herein are desirable as colorant dyestuffs. Those dyes represented hereinabove by Formula II, i.e., wherein the μ-substituent is a monovalent organic residue, are also advantageous as spectral sensitizers for photographic silver halide emulsions when incorporated therein. These dyes are especially useful for extending the spectral sensitivity of the customarily employed silver chloride, silver chlorobromide, silver bromide, silver bromoiodide and silver chlorobromoiodide developing out emulsions using a hydrophilic colloid carrier or binding agent such as gelatin, its water-soluble derivatives, polyvinyl alcohol, its water-soluble derivatives and copolymers, water-soluble vinyl polymers, such as polyacrylamide, imidized polyacrylamide, etc., and other water-soluble film-forming materials that form water-permeable coatings, such as colloidal albumin, water-soluble cellulose derivatives like ethylanolamine cellulose acetate, etc.

The binding agents for the photographic emulsions can also contain dispersed polymerized vinyl compounds. Certain of such compounds are disclosed, for example, in U.S. Pat. Nos. 3,142,568, of Nottorf issued July 28, 1964; 3,193,386, of White issued July 6, 1965; 3,062,672 of Houck et al. issued Nov. 6, 1962; and 3,220,844 of Houck et al. issued Nov. 30, 1965; and include the water-insoluble polymers and latex copolymers of alkyl acrylates and methacrylates, acrylic acid, sulfoalkyl acrylates or methacrylates and the like. To prepare emulsions sensitized with one or more of the suitable dyes described herein, it is only necessary to disperse the dye or dyes in the emulsions. The methods of incorporating dyes in emulsions are simple and well known to those skilled in the art. In practice, it is convenient to add the dyes to the emulsion in the form of a solution in a suitable solvent. Methanol, ethanol, propanol, etc., acetone and pyridine are used to advantage. The dyes are advantageously incorporated in the finished washed emulsions, and should be substantially uniformly distributed throughout the emulsions.

Advantageously, the dyes are incorporated into an emulsion in a sensitizing amount and the concentration of dye in a particular emulsion can vary widely and depends upon the type of emulsion and the effect desired. The suitable and most economical concentration for any given emulsion and any specific use will be apparent to those skilled in the art upon making the ordinary tests and observations customarily used in the art of emulsion making. Generally, concentrations of from about 50 mg. to about 1,000 mg. per mole of silver, based on the silver halide are used.

The emulsions described herein can also be sensitized with chemical sensitizers, such as with reducing agents; sulfur, selenium or tellurium compounds; gold, platinum or palladium compounds; or combinations of these. Suitable procedures are described in Shepard U.S. Pat. No. 1,623,499; Allen U.S. Pat. No. 2,399,083; McVeigh U.S. Pat. No. 3,297,447; and Dunn U.S. Pat. No. 3,297,446.

As well as including the sensitizing dyes of this invention and chemical sensitizers, the silver halide emulsions can be protected against the production of fog and can be stabilized against loss of sensitivity during keeping. Suitable antifoggants and stabilizers each used alone or in combination include, for example, thiazolium salts described in Staud U.S. Pat. No. 2,131,038, and Allen U.S. Pat. No. 2,694,716; the azaindenes described in Piper U.S. Pat. No. 2,886,437, and Heimbach U.S. Pat. No. 2,444,605, the mercury salts as described in Allen U.S. Pat. No. 2,728,663; the urazoles described in Anderson U.S. Pat. No. 3,287,135; the sulfocatechols described in Kennard U.S. Pat. No. 3,236,652; the oximes described in Carroll et al. British Pat. No. 623,448; nitron; nitroindazoles; the mercaptotetrazoles described in Kendall et al. U.S. Pat. No. 2,403,927, Kennard et al. U.S. Pat. No. 3,266,897, and Luckey et al. U.S. Pat. No. 3,397,987; the polyvalent metal salts described in Jones U.S. Pat. No. 2,839,405; the thiuronium salts described in Herz U.S. Pat. No. 3,220,839; the palladium platinum and gold salts described in Trivelli U.S. Pat. No. 2,566,263 and Damschroder U.S. Pat. No. 2,597,915.

Additionally, the emulsions useful herein can be hardened with any suitable hardener or combinations such as, e.g., formaldehyde, mucochloric acid, glutaraldehyde, maleic dialdehyde, aldehyde hardeners, aziridine hardeners, hardeners which are derivatives of dioxane, vinyl sulfones, oxypolysaccharides such as oxystarch, oxy plant gums, inorganic hardeners such as chromium salts, and the like. Developing agents of the types suitable for developing out silver halide emulsions can also be included for desired development effects such as monobath processing.

The photographic silver halide emulsions or coatings disclosed herein can also contain non-ionic, anionic and/or amphoteric coating aids. Some useful coating aids include, for example, saponin, alkyl substituted aryl oxy alkylene ethyl sulfonates of the type described in U.S. Pat. No. 2,600,831, issued June 17, 1952, maleoprimarates of the type described in U.S. Pat. No. 2,823,123, issued Feb. 11, 1958, taurine derivatives of the type described in U.S. Pat. No. 2,739,891, issued on Mar. 27, 1956, and alkyl aminopropionates of the type described in U.S. Pat. No. 3,133,816, issued May 19, 1964. Typical of still other useful coating aids and surfactants which can be employed in the emulsions of this invention include the alkylphenoxy poly(hydroxyalkylene oxides) such as alkylphenoxy poly(glycidols) having from about five to about 12 glycidol units, for example, such as those disclosed in British Pat. No. 1,022,878, issued Mar. 16, 1966 to Olin Mathieson.

Conventionally, a silver halide emulsion of the disclosed types and containing at least one of the dyes of this invention as well as additional addenda is coated onto a photographic support material and dried to prepare a composite photographic element. Coating can be accomplished by a wide variety of techniques including hopper coating, flow coating, extrusion hopper coating, doctor blade coating, etc. Advantageous support materials include conventional photographic film base materials such as cellulose nitrate film, cellulose ester film, poly(vinyl acetal)film, polystyrene film, poly(ethylene terephthalate) film, polycarbonate film and related films or resinous materials, as well as glass, paper, metal and the like. Typically, a flexible support is employed especially a paper support, which can be partially acetylated or coated with baryta and/or an alpha-olefin polymer, particularly a polymer of an alpha-olefin containing two to 10 carbon atoms such as polyethylene, polypropylene, ethylenebutene copolymers and the like.

Photographic elements such as those previously described can be imagewise exposed and developed to prepare visible images. Useful developer compositions include a reducing agent which promotes the formation of a metallic silver image in the vicinity of latent (i.e., not visible) image specks of silver metal produced on exposure.

Typically reducing agents used in the developer composition include, for example, polyhydroxy-substituted aryl compounds such as hydroquinones, catechols and pyrogallols; ascorbic acid derivatives; aminophenols; p-phenylenediamines, and the like developing agents used in the photographic art. Particular examples of reducing agents for developer solutions are 2-methyl-3-chlorohydroquinone, bromohydroquinone, catechol, 5-phenylcatechol, pyrogallol monomethyl ether (1-methoxy-2,3-dihydroxybenzene) and 5-methylpyrogallol monomethyl ether, isoascorbic acid, N-methyl-p-aminophenol, dimethyl-p-phenylene diamine, 4-amino-N,N-di(n-propyl)aniline and 6-amino-1-ethyl-1,2,3,4-tetrahydroquinoline.

An exemplary developer composition, including a reducing agent such as those previously mentioned, has the formula:

| | |
|---|---|
| p-methylaminophenol | 3 gm. |
| Sodium sulfite (dessicated) | 45 gm. |
| Hydroquinone | 12 gm. |
| Sodium Carbonate (monohydrate) | 80 gm. |
| Potassium bromide | 2 gm. |
| Water to make | 1,000 cc. |

After development, residual unreduced silver halide is generally removed to stabilize the image, usually by the use of a fixing agent. Conventional fixing agents or silver halide solubilizing agents include water-soluble thiosulfates, thiocyanates and mercaptans such as ammonium thiosulfate, sodium thiocyanate and the disodium salt of 2-mercapto-4-hydroxy-5-aminopyrimidine. A particularly preferred fixing agent is sodium thiosulfate. Stabilization is generally accomplished by treatment with a fixing bath that incorporates a fixing agent such as those mentioned previously. An exemplary fixing bath is one having the formula:

| Sodium thiosulfate | 240 gm. |
|---|---|
| Sodium sulfite (dessicated) | 15 gm. |
| Acetic acid (28% aqueous) | 48 cc. |
| Boric acid (crystals) | 7.5 gm. |
| Potassium alum | 15 gm. |
| Water to make | 1,000 cc. |

The following examples are included for a further understanding of the invention.

EXAMPLE 1

3,3'-Diethyl-$\mu$-(1-phenyl-5-tetrazolythio)thiacarbo-cyanine iodide is prepared as follows:

$\mu$-Chloro-3,3'-diethylthiacarbocyanine chloride (4.4 g., 10 mmol.), 5-mercapto-1-phenyltetrazole (1.78 g., 10 mmol) triethylamine (2.1 ml., 15 mmol) and dimethylformamide (20 ml.) are heated at 80°–90° for 8 minutes. The mixture is cooled and diluted with water. The iodide salt of the dye is precipitated by treating the aqueous mixture with an aqueous sodium iodide (1.50 g., 10 mmol.). The mixture is chilled overnight and filtered. Yield 3.3 g. (64 percent). Recrystallization twice from a mixture of methanol and dimethylformamide yields 36 percent of pure dye melting at 201–203° C(dec).

EXAMPLE 2

3,3'-Diethyl-$\mu$-(1-imidazolyl)thiacarbocyanine chloride is prepared as follows: $\mu$-Chloro-3,3'-diethylthiacarbocyanine chloride (3.04 g., 7 mmol), imidazole (0.52 g., 7.7 mmol), triethylamino (1.0 ml., 7 mmol) and dimethylformamide (20 ml.) are refluxed with stirring for one minute whereupon all of the 550nm absorption band of the 9-chloro dye precursor disappears in favor of a sharp band around 565 nm as determined by a hand spectroscope. The solution is cooled and diluted with ether. The residue is then crystallized by being shaken with a suspension of ether and water, after which the suspension is filtered and washed with water. The dried dye weighs 1.80 g., a 55 percent yield. Two recrystallizations from pyridine and 2-butanone mixtures gives 28 percent of dye melting at 235°–238° C(dec).

EXAMPLE 3

$\mu$-(1-Benzimidazolyl)-3,3'-diethylthiacarbocyanine chloride is prepared as follows: $\mu$-Chloro-3,3'-diethylthiacarbocyanine chloride (4.35 g., 10 mmol), benzimidazole (1.30 g., 11 mmol), triethylamine (1.4 ml., 10 mmol) and dimethylformamide (20 ml.) are refluxed for 2 minutes (until the chloro dye band disappears as determined by the procedure of Example 2). The mixture is cooled, diluted with water and ice and chilled overnight. The dye is filtered off and washed with water. The yield is 2.58 g. (50 percent). Two recrystallizations from acetonitrile and ethanol mixtures, (95 percent acetonitrile; 5 percent ethanol) give 18 percent of dye melting at 229°–231° d.C.

EXAMPLE 4

$\mu$-(1-Benzotriazolyl)-3,3'-diethylthiacarbocyanine chloride is prepared as follows: $\mu$-Chloro-3,3'-diethylthiacarbocyanine chloride (3.04 g., 7 mmol), benzotriazole (0.92 g., 7.7 mmol), triethylamine (1.4 ml., 10 mmol) and dimethylformamide (20 ml.) are refluxed for 1.5 minutes and treated as in Example 3. The yield is 1.66 g. (46 percent). Two recrystallizations from 85 percent ethanol yield 26 percent of dye melting at 242° C(dec).

EXAMPLE 5

3,3'-Diethyl-$\mu$-(3,5-dimethyl-1-pyrazolyl) thiacarbocyanine iodide is prepared as follows: $\mu$-Chloro-3,3'-diethylthiacarbocyanine chloride (3.04 g., 7 mmol), 3,5-dimethylpyrazole (0.74 g., 7.7 mmol), triethylamine (1.0 ml.) and dimethylformamide (20 ml.) are refluxed for 1½ minutes and treated as in Example 2. The semi-crystalline dye dissolved in ethanol is converted to the iodide salt by addition of 0.6 gram of sodium iodide in ethanol. The yield is 1.46 g. (36 percent). Two recrystallizations from ethanol yield 15 percent of dye melting at 272°–273° C(dec).

EXAMPLE 6

$\mu$-Cyano-3,3'-diethylthiacarbocyanine chloride is prepared as follows: $\mu$-Chloro-3,3'-diethylthiacarbocyanine chloride (3.04 g., 7 mmol), sodium cyanide (0.82 g., 17 mmol), and ethanol (15 ml.) are refluxed until no chloro dye remains. The dye is isolated by precipitation with ether as in Example 2. The yield is 1.42 g., 48 percent. Two recrystallizations from ethanol yield 21 percent of dye, m.p. 252°–254° C(dec).

EXAMPLE 7

$\mu$-(9-Carbazolyl)-3,3'-diethylthiacarbocyanine chloride is prepared as follows: To dimethylformamide (25 ml.) is added carbazole (1.24 g., 7.4 mmol) and a 54 percent dispersion of sodium hydride in mineral oil, (0.33 g., 7.4 mmol). The mixture is heated slightly and allowed to react until the effervesence ceases. Then $\mu$-chloro-3,3'-diethylthiacarbocyanine chloride (3.04 g., 7 mmol) is added and the mixture heated to near boiling. When the 550 nm band disappears (as in Example 2), the mixture is cooled. The dye is precipitated by adding water, after which the dye precipitate is filter off. The yield of dried dye is 1.54 g. (40 percent). Two recrystallizations from ethanol give 14 percent of pure dye, melting at 258°–260° C(dec).

EXAMPLE 8

2-Bis(phenoxysulfonyl)methylene-1,3-bis(3-ethyl-2-benzothiazolinylidene)propane is prepared as follows: $\mu$-Chloro-3,3'-diethylthiacarbocyanine fluoborate (2.44 g., 5 mmol) diphenyl methanedisulfonate (1.80 g., 5.5 mmol), triethylamine (1.8 ml., 12.5 mmol) and dimethylformamide (15 ml.) are heated together to 120° C. and held there until the 550 nm band of the chloro dye disappears (as determined by the procedure of Example 2). The mixture is cooled and diluted with ice and water. The resulting dye precipitate is filtered off and dried. The yield is 3.38 g. (98 percent). Two recrystallizations from methanol and pyridine give 78 percent of pure dye melting at 212°–214° C(dec).

EXAMPLE 9

2-Bis(ethylsulfonyl)methylene-1,3-bis(3-ethyl-2-benzothiazolinylidene)propane is prepared as follows: $\mu$-Chloro-3,3'-diethylthiacarbocyanine chloride (3.04 g., 7 mmol), sodium salt of bis(ethylsulfonyl)methane (3.42 g., 15.4 mmol), tetrahydrofuran (10 ml.) and acetonitrile (10 ml.) are refluxed together for 5 minutes. After cooling the mixture is diluted with water to yield a gummy precipitate which crystallizes on stirring with hot methanol. The yield is 1.80 g. (46 percent). Two recrystallizations from methanol give 21 percent of pure dye melting at 209°–211° C(dec).

EXAMPLE 10

A sensitizing amount of each of the above dyes from preceding Examples 1–7 are dissolved in a suitable solvent and added to separate portions of a gelatin-silver halide emulsion at the concentrations indicated below. After a 10 minute digestion at 52° C., each emulsion is coated on cellulose ester support at a coverage of 432 mg. Ag/ft² and dried. Spectrographic exposures are made on each coating and these are processed in a photographic developer having the composition:

| | |
|---|---|
| p-Methylaminophenol sulfate | 2.0 grams |
| Sodium sulfite, desiccated | 90.0 grams |
| Hydroquinone | 8.0 grams |
| Sodium carbonate·H₂O | 52.5 grams |
| Potassium bromide | 5.0 grams |
| Water to make | 1 liter | fixed in a conventional sodium thiosulfate fixing bath, washed and dried. The following table summarizes the wavelength light to which maximum sensitivity is obtained and the longest wavelength light to which each is sensitized.

| Silver halide in emulsion | Dye concentration, mg./mol Ag | Wavelength of light in nm. to which— | |
|---|---|---|---|
| | | Dye produces maximum sensitivity | Dye sensitizes emulsion |
| Dye Example No.: | | | |
| 1 Silver bromoiodide | 80 | (¹) | (¹) |
| Silver chlorobromide | 130 | 625 | 650 |
| 2 Silver bromoiodide | 80 | 625 | 650 |
| Silver chlorobromide | 130 | 630 | 650 |
| 3 Silver bromoiodide | 80 | 600 | 650 |
| Silver chlorobromide | 130 | 640 | 660 |
| 4 Silver bromoiodide | 80 | 630 | 650 |
| Silver chlorobromide | 130 | 645 | 660 |
| 5 Silver bromoiodide | 80 | 610 | 640 |
| Silver chlorobromide | 130 | 640 | 660 |
| 6 Silver bromoiodide | 80 | 625 | 650 |
| Silver chlorobromide | 130 | 630 | 650 |
| 7 Silver bromoiodide | 80 | 625 | 640 |
| Silver chlorobromide | 130 | 620 | 630 |

¹ No efficient sensitization.

The invention has been described in detail with particular reference to certain preferred embodiments thereof, but it will be understood that variations and modifications can be effected within the spirit and scope of the invention.

We claim:

1. A light-sensitive, photographic silver halide emulsion comprising a hydrophilic colloid, silver halide grains and a sensitizing amount of a μ-substituted carbocyanine dye derived from a μ-chlorocarbocyanine dye and wherein the μ-substituent is a monovalent organic residue selected from imidazolyl, benzimidazolyl, benzotriazolyl, 3,5-dimethylpyrazolyl and carbazolyl.

2. A light-sensitive, photographic silver halide emulsion comprising a hydrophilic colloid, silver halide grains, and a sensitizing amount of a meso-substituted carbocyanine dye having the formula:

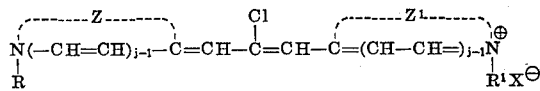

wherein:

a. each of Z and Z¹ represents the non-metallic carbon atoms necessary to complete a 5- to 6-membered heterocyclic nucleus wherein the remaining atoms are selected from carbon, oxygen, nitrogen, sulfur and selenium, b. $j$ represents a positive integer having a value of from 1 to 2, c. each of R and R¹ represents an alkyl radical having from one to four carbon atoms, d. $X^{\ominus}$ represents a non-nucleophilic anion, and e. G represents a monovalent organic residue selected from imidazolyl, benzimidazolyl, benzotriazolyl, 3,5-dimethylpyrazolyl and carbazolyl.

3. A light-sensitive, photographic silver halide emulsion as described in claim 2 wherein each of Z and Z¹ represent the non-metallic atoms necessary to complete a heterocyclic nucleus having in said nucleus at least one atom selected from the group consisting of nitrogen, oxygen, sulfur and selenium.

4. A light-sensitive, photographic silver halide emulsion as described in claim 2 wherein each of Z and Z¹ represents the non-metallic atoms necessary to complete a heterocyclic nucleus selected from the group consisting of an indole nucleus, an imidazole nucleus, an oxazole nucleus, a thiazole nucleus, a selenazole nucleus and a quinoline nucleus.

5. A light-sensitive, photographic silver halide emulsion as described in claim 2 wherein the non-nucleophilic anion represented by X is selected from the group consisting of a halide anion, a fluoborate anion, a sulfate anion, a hydrogen sulfate anion, an arylsulfonate anion and a trifluoroacetate anion.

6. A light-sensitive, photographic silver halide emulsion as described in claim 2 wherein the carbocyanine dye is selected from the group consisting of:

a. 3,3'-Diethyl-μ-(1-imidazolyl)thiacarbocyanine chloride
b. μ-(1-Benzimidazolyl)-3,3'-diethylthiacarbocyanine chloride
c. μ-(1-Benzotriazolyl)-3,3'-diethylthiacarbocyanine chloride
d. 3,3'-Diethyl-μ-(3,5-diethyl-1-pyrazolyl)thiacarbocyanine iodide, and
e. μ-(9-Carbazolyl)-3,3'-diethylthiacarbocyanine chloride.

* * * * *

PO-1050
(5/69)

UNITED STATES PATENT OFFICE
CERTIFICATE OF CORRECTION

Patent No. 3,656,957        Dated April 18, 1972

Inventor(s) Gene L. Oliver and Leslie G.S. Brooker    -1-

It is certified that error appears in the above-identified patent and that said Letters Patent are hereby corrected as shown below:

First page, in the Title, delete "K-substituted" and insert --- $\mu$-substituted ---.

First page, under "References Cited UNITED STATES PATENTS" delete "Haseltine et al" and insert ---Heseltine et al---.

Column 1, line 55, delete "stitent" and insert ---stituent---.

Column 1, line 56, delete "alkyl-mercaptide" and insert ---alkylmercaptide---.

Column 1, lines 70-75, the formula should be labeled ---I--- and delete $$\begin{array}{c} \oplus \\ N \\ | \\ R^1 X^{\ominus} \end{array}$$

and insert $$\begin{array}{c} \oplus \\ N \\ | \\ R^1 \end{array} \quad X^{\ominus}$$

---

Column 3, line 9, delete "dibenzothiacarbo-cyanine" and insert ---dibenzothiacarbocyanine ---.

Column 4, line 47, delete "X" and insert ---$X^{\ominus}$---.

Page 2

UNITED STATES PATENT OFFICE
CERTIFICATE OF CORRECTION

Patent No. 3,656,957  Dated April 18, 1972

Inventor(s) Gene L. Oliver and Leslie G.S. Brooker

It is certified that error appears in the above-identified patent and that said Letters Patent are hereby corrected as shown below:

Column 7, line 25, delete "thiacarbo-cyanine" and insert ---thiacarbocyanine---.

Column 8, line 39, delete "filter" and insert ---filtered---.

Column 9, lines 55-60, in the structural formula, delete

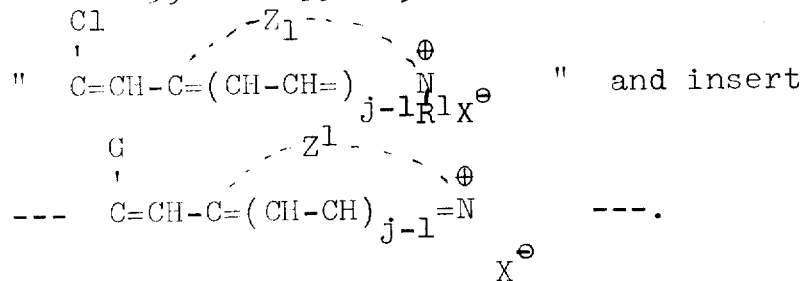

" and insert ---.

Column 10, line 58, delete "diethyl" (second occurrence) and insert ---dimethyl---.

Signed and sealed this 3rd day of October 1972.

(SEAL)
Attest:

EDWARD M. FLETCHER, JR.
Attesting Officer

ROBERT GOTTSCHALK
Commissioner of Patents